(12) United States Patent
Dubois et al.

(10) Patent No.: US 9,104,045 B2
(45) Date of Patent: Aug. 11, 2015

(54) METHOD OF DETERMINING PARAMETERS FOR FITTING AN OPHTHALMIC LENS TO A FRAME

(75) Inventors: Frédéric Dubois, Charenton-le-Pont (FR); David Freson, Charenton-le-Pont (FR)

(73) Assignee: ESSiLOR INTERNATIONAL (COMPAGNIE GENFRALE D'OPTIQUE), Charenton le Pont (FR)

( * ) Notice: Subject to any disclaimer, the term of this patent is extended or adjusted under 35 U.S.C. 154(b) by 874 days.

(21) Appl. No.: 12/811,094

(22) PCT Filed: Dec. 24, 2008

(86) PCT No.: PCT/EP2008/068297
§ 371 (c)(1),
(2), (4) Date: Dec. 10, 2010

(87) PCT Pub. No.: WO2009/065969
PCT Pub. Date: May 28, 2009

(65) Prior Publication Data
US 2011/0085132 A1   Apr. 14, 2011

(30) Foreign Application Priority Data
Dec. 28, 2007   (EP) ..................... 07301759

(51) Int. Cl.
*G02C 13/00*   (2006.01)
*B24B 9/14*   (2006.01)

(52) U.S. Cl.
CPC .............. *G02C 13/005* (2013.01); *B24B 9/144* (2013.01); *B24B 9/146* (2013.01); *G02C 13/003* (2013.01)

(58) Field of Classification Search
CPC ...... G02C 13/005; G02C 13/003; B24B 9/14; B24B 9/144; B24B 9/146
USPC .................. 351/178, 159.67, 159.75, 159.73; 33/200
See application file for complete search history.

(56) References Cited

U.S. PATENT DOCUMENTS

| | | | |
|---|---|---|---|
| 5,485,399 A * | 1/1996 | Saigo et al. .................... 351/178 |
| 5,881,467 A * | 3/1999 | Clara et al. ...................... 33/200 |
| 6,122,063 A | 9/2000 | Berndt et al. |
| 6,249,991 B1 * | 6/2001 | Rarick et al. ....................... 33/28 |
| 6,637,880 B1 * | 10/2003 | Yamakaji et al. ......... 351/159.75 |
| 2002/0166247 A1 * | 11/2002 | Andrews et al. ................ 33/200 |

FOREIGN PATENT DOCUMENTS

| | | |
|---|---|---|
| EP | 0 583 915 | 2/1994 |
| FR | 2 898 690 | 9/2007 |
| JP | 59-54133 | 4/1984 |
| JP | 09-145351 | 6/1997 |
| JP | 10-186293 | 7/1998 |
| JP | 2001-004964 | 1/2001 |
| JP | 2002-072156 | 3/2002 |
| JP | 2003-172618 | 6/2003 |
| JP | 2003-231001 | 8/2003 |

(Continued)

*Primary Examiner* — Zachary Wilkes
(74) *Attorney, Agent, or Firm* — Cozen O'Connor

(57) ABSTRACT

A method of determining parameters for fitting an ophthalmic lens to a frame, including the following steps: providing an eyeglass frame including at least one temple portion having a bezel intended to enable the nesting of an ophthalmic lens; and determining the shape of the profile of the bezel at a point in the temple portion of said frame. Associated method of fabricating an ophthalmic lens.

9 Claims, 3 Drawing Sheets

(56) References Cited

FOREIGN PATENT DOCUMENTS

| | | |
|---|---|---|
| JP | 2004-003943 | 1/2004 |
| JP | 2006-119342 | 5/2006 |
| JP | 2007-240280 | 9/2007 |
| WO | WO 2007/065984 | 6/2007 |
| WO | WO 2007065984 A1 * | 6/2007 |
| WO | WO 2007/128902 | 11/2007 |

* cited by examiner

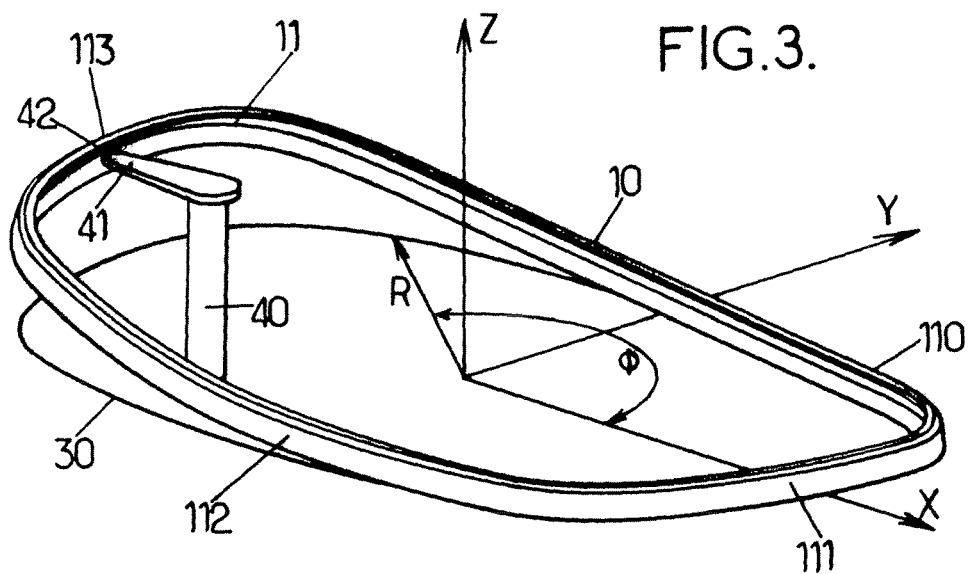
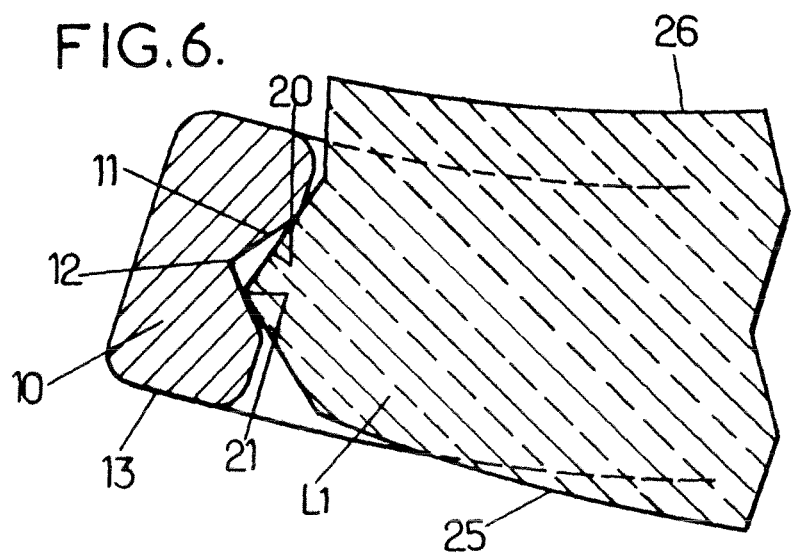

METHOD OF DETERMINING PARAMETERS FOR FITTING AN OPHTHALMIC LENS TO A FRAME

RELATED APPLICATIONS

This is a U.S. national stage of application No. PCT/EP2008/068297, filed on Dec. 24, 2008, and claims priority on European application No. 07301759.2, filed on Dec. 28, 2007, the entire content of which is hereby incorporated by reference.

FIELD OF THE INVENTION

The present invention concerns a method of determining parameters for fitting an ophthalmic lens to a frame. The present invention is generally directed to fitting ophthalmic lenses to the bezels of eyeglass frames by nesting them therein.

BACKGROUND OF THE INVENTION

The technical part of the profession of the optician consists in fitting a pair of ophthalmic lenses to a frame selected by a wearer. This task comprises five main operations:
  acquiring framing parameters, notably geometrical data of the bezels of the rims of the frame selected by the wearer, in particular the curve traced out by the bottom of the bezel, and, where appropriate, the shape of the section of the bezel;
  centring each lens, i.e. determining the position that each lens will occupy in the frame in order to be correctly centred in front of the pupil of the eye of the wearer so that it performs correctly the optical function for which it was designed;
  using a feeler system to determine the coordinates of points on each face of each lens characterizing the geometry of its contour after trimming, then
  producing setpoint trimming radii (in the form of what is called a radii reproduction function) that defines the intended spatial position of the contour on the lens to be trimmed taking account of the geometrical data read from the corresponding bezel, the defined centring parameters, and the coordinates of the lens determined by the feeler system, and finally
  trimming each lens, i.e. machining or cutting its contour to the required shape, taking account of the defined setpoint trimming radii, where appropriate, at the end of machining, using a bevelling grinding tool for bevelling, i.e. producing a bevel on the edge of the lens intended to retain the lens in the bezel of the frame.

To simplify and to improve the quality of the work carried out by the optician, it is desirable for the machining to be sufficiently precise for the lens to nest exactly and without force in the bezel of the frame chosen by the wearer. This precision avoids the optician being obliged to trim and bevel the lens repeatedly in order to fit it to its frame.

To obtain very high precision it is possible to determine the geometrical data of the bezel, including the shape of its section, at numerous points on the contour of the rims of the frame. Such measurements are time-consuming and wearisome, however.

SUMMARY OF THE INVENTION

One object of the invention is to determine the parameters for fitting an ophthalmic lens to a frame more quickly and more simply.

One aspect of the present invention is directed to a method of determining parameters for fitting an ophthalmic lens to a frame, the method including the following steps:
  providing an eyeglass frame including at least one temple portion having a bezel adapted to enable the nesting of an ophthalmic lens;
  determining the shape of the profile of the bezel at a point in the temple portion of said frame.

In the context of the present invention, the expression "determining the shape of the profile of the bezel" refers to determining the geometrical characteristics adapted at least to enable the determination at one point of the aperture angle A of the bezel and/or its aperture D, together with its angular position relative to the X,Y plane, denoted the plane P in FIG. 1, which angle is referred to as the "tilt angle".

The inventors have found that determining the shape of the bezel at a point on the temple portion of the frame provides very valuable information that can greatly reduce the number of measurements of the shape of the bezel along the contour of the rim of the frame. They have found in particular that fabricating the rim from a bezel wire is liable to lead to variations in the shape of the bezel along the contour of the finished rim that vary from one method to another. They have shown that measuring the shape of the bezel at a point on the temple portion of the frame provides information on how the rim of the frame was fabricated.

In various embodiments, which can be combined, the method of the invention can have the following features:
  the profile of the bezel is determined at only one point for each of the rims of the frame;
  the frame is a closed frame;
  the frame is a semi-open frame;
  the shape of the profile of the bezel as determined at a point in the temple portion of the frame is compared to a database;
  whether the frame is the result of deformation of a bezel wire on a bowl or of deformation of a bezel wire using a 3D rim-shaping machine is determined;
  the shape of the bezel as determined at a point in the temple portion of the frame is associated with data concerning the evolution of the inclination of the bezel around the frame.

The invention also provides a method of fabricating an ophthalmic lens, the method comprising the following steps:
  determining at least the framing parameters of a chosen eyeglass frame;
  calculating trimming parameters comprising the contour of the finished lens and the shape of a bevel along that contour in order to enable nesting in the chosen eyeglass frame.

Thanks to the method of the invention, it is possible to determine simply and quickly the shape of the bezel and its inclination along the contour of the rims of the chosen frame. In the usual way, the inclination of the bezel is referred to as the "tilt angle". This geometrical data of the bezel of a rim can then be used to optimize the shape of the bevel on the lens to be inserted into the rim of the chosen frame.

It is then possible to choose the required type of fit between the frame and the lens. For example, it is then possible to obtain lenses which after trimming have a thin edge and the bevel produced on the lens does not bear against the edges defining the mouth of the bezel but fits inside the bezel and bears on its flanks.

For example, when the lens is thin and its bevel fits inside the bezel, the distance between the top of the bevel and the bottom of the bezel varies as a function of the aperture angle of the bezel. Knowing this angle therefore enables precise calculation of said distance in order to refine the framing parameters.

The invention finds one advantageous application when the thickness of the ophthalmic lens is less than the aperture width of the bezel at one point at least on its finished contour. The thickness of the ophthalmic lens and the aperture width of the bezel can be compared at a number of points on the finished contour of the ophthalmic lens to deduce framing parameters, in particular setpoint trimming radii for the ophthalmic lens. Thus if the thickness of the ophthalmic lens is greater than the aperture width of the bezel, it is deduced that the bevel fits inside the bezel to a constant depth in that the flanks of the bevel always bear on the edges defining the mouth of the bezel. On the other hand, if the thickness of the ophthalmic lens is less than the aperture width of the bezel, it is deduced that this fit varies as a function of the thickness of the lens and that this variation must be taken into account to produce the setpoint trimming radii.

In other embodiments, a trimming profile is chosen for the lenses that renders them flush with the edges of the rims of the frame.

The ophthalmic lens is usually intended to have a bevel on its edge and the intended distance between the bottom of the bezel and the top of said bevel is calculated.

Thus, during subsequent trimming of the lens according to the setpoint trimming radii by a trimming device including a grinding tool provided with a bevelling groove, the setpoint radii provide the trimming device with the length that each radius of the lens must have, from its optical centre to the top of its bevel. From this, the position of the bottom of the bevelling groove of the trimming device being precisely known, bevelling the lens is a simple matter.

The setpoint trimming radii can be defined in the form of a radii reproduction function giving, for each given radius of the ophthalmic lens, the length of that given radius of the ophthalmic lens.

It is equally possible to deduce the setpoint trimming radii as a function of the tilt angle formed between the bisector of the bezel and the bisector of the bevel.

Thus when the bezel of the frame is tilted, i.e. when it is at a non-zero angle to the general plane of the frame (the plane passing through the bridge of the frame and normal to the two branches of the frame when unfolded), account can be taken of the fact that this angle influences the position of the bevel on the lens on the flanks of the bezel on the frame. The two edges of the bevel then do not bear on the flanks of the bezel at the same height, but are offset relative to each other, and so the distance between the top of the bevel and the bottom of the bezel varies.

For example, the document WO 2007/065984 describes a method of producing setpoint trimming radii for an ophthalmic lens enabling the use of framing parameters determined by the method of the present invention.

BRIEF DESCRIPTION OF THE DRAWINGS

The following description with reference to the appended drawings, which are provided by way of nonlimiting example, explains clearly in what the invention consists and how it can be put into practice.

In the appended drawings:

FIG. 3 represents a diagrammatic view of one method of the invention of determining the shape of the bezel at a point on the temple portion of the frame;

FIG. 6 represents a diagrammatic sectional view of the nesting of a bevelled lens in a bezel.

DETAILED DESCRIPTION OF THE DRAWINGS

The well known means that can be used include equipment reading off the contours and sections of bezels of rims of eyeglass frames described in the document EP 0819967. It is equally possible to use an ophthalmic lens trimming device like the Essilor Kappa device described in the document FR 2784919 and an ophthalmic lens feeler system such as that described in the document FR 2543039.

An optician then places the chosen frame 10 on the wearer and marks the position of the pupillary points relative to each rim of the frame 10, which pupillary points are points in front of the pupils of the eyes of the wearer in the general plane P of the frame 10.

The general plane P is typically the plane that passes through the nose bridge connecting the two rims of the frame 10 and that is orthogonal, on the one hand, to the plane of symmetry of the frame and, on the other hand, to the plane containing the two branches of said frame when in the unfolded position.

When using a feeler system to palpate the bezel of said rim, the pupillary point of each rim is used as the origin of coordinates of the feeler system.

Alternatively, the optician can carry out this identifying operation using image acquisition and recognition software performing electronic and/or computerized identification of the pupillary points from a photo of the face of the wearer when wearing the chosen frame 10.

Figure 1:
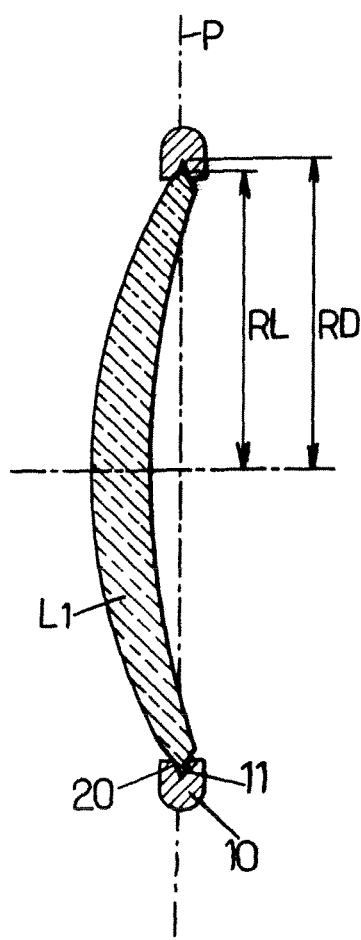
FIG. 1 is a view in section of an ophthalmic lens bevelled according to the invention and nested in an eyeglass frame bezel.

FIG. 1 represents in section the cross section of an ophthalmic lens L1 nested in a bezel 11 of a rim of an eyeglass frame 10. This nesting is such that the lenses are fitted to said frame using a chosen assembly method in order to perform correctly the optical functions for which they were designed.

To produce such nesting, various geometrical characteristics of the ophthalmic lens L1 and the bezel 11 of its frame 10 are measured in order to be able to machine the ophthalmic lens L1 to a final contour adapted to achieve such nesting precisely.

During a first step of the method of the invention, the geometrical characteristics of the profile of the bezel 11 are measured at one point on the temple portion of the frame. Equipment for reading off contours such as that described in the document EP0819967 can be used for this, for example, and measures the coordinates of a plurality of points on the bezel 11 and sends them to the electronic and computer system, which stores them.

Figure 2:
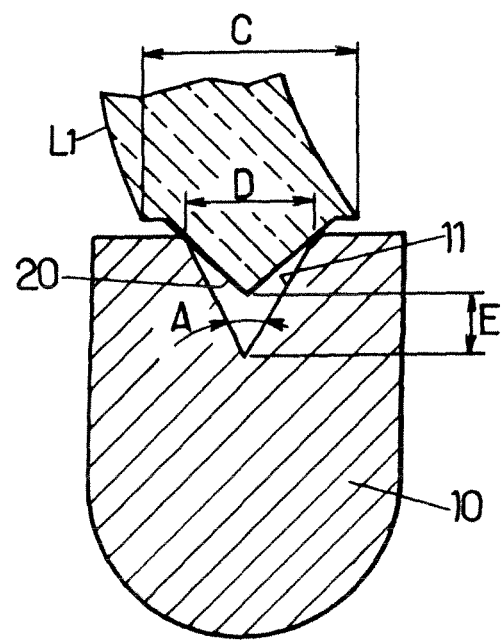
FIG. 2 is a partial view in section of part of the ophthalmic lens from FIG. 1.

To be more precise, the bottom of the bezel 11 forms a groove along the internal periphery of the rim of the frame 10. The bezel 11 also has, as seen in cross section, as represented in FIG. 2, a dihedral profile the two flanks whereof intersect at the bottom of the bezel 11 and together define an aperture angle A and an aperture width D of the bezel. The cross section of the bezel 11 is generally the same over the entire length of the contour formed by the bezel 11, and only the inclination of the bezel can change, and can be highly inclined to the general plane P if the frame 10 is strongly curved.

In the case of a frame with rims formed as represented here, the lens L1 is cut with a bevel 20 at its perimeter and its thickness C can be greater than the aperture width D of the bezel.

The invention is nevertheless not limited in any way to frames with closed rims, and can also find applications in semi-open frames where only a portion of the periphery of the lens is retained by nesting it in the frame. Such frames can include a wire that retains the lens, for example. In this case the bevel on the lens is replaced by a groove, generally a U-shaped groove, and the wire is held in the bezel of the frame, which in these embodiments is U-shaped.

Fitting the lens L1 into the frame 20 can result in an offset E between the edge of the bevel on the lens L1 and the bottom of the bezel 11.

FIG. 3 represents the step of measuring the profile of the bezel at a point on the temple portion of the frame 10. The frame 10 has four main parts: an upper part 110, a nasal part 111, a lower part 112, and a temple part 113. It goes without saying that each of the rims of the same frame has these portions disposed symmetrically with respect to the nasal axis passing through the bridge of the frame.

The contour measuring system 40 has a mobile portion for tracing a contour using either polar coordinates (Ø, R, Z) or Cartesian coordinates (X, Y, Z).

Numerous documents, including the document U.S. Pat. No. 5,121,548, explain how such contour measuring systems work. The system represented includes an arm 41 at the end of which there is a ball 42, for example. The measurement is effected by tracing points of contact of the ball 42 with the bottom or the edges of the bezel 11.

The contour measuring system 40 determines the contour of the bezel 11 in the conventional way.

It is further used in the context of the present invention to determine the shape of the profile of the bezel at a point in the temple part 113 of the frame.

The perimeter of the contour of the bezel 11 can be projected onto the plane X, Y according to the trace 30 for subsequent calculations.

Figure 4:
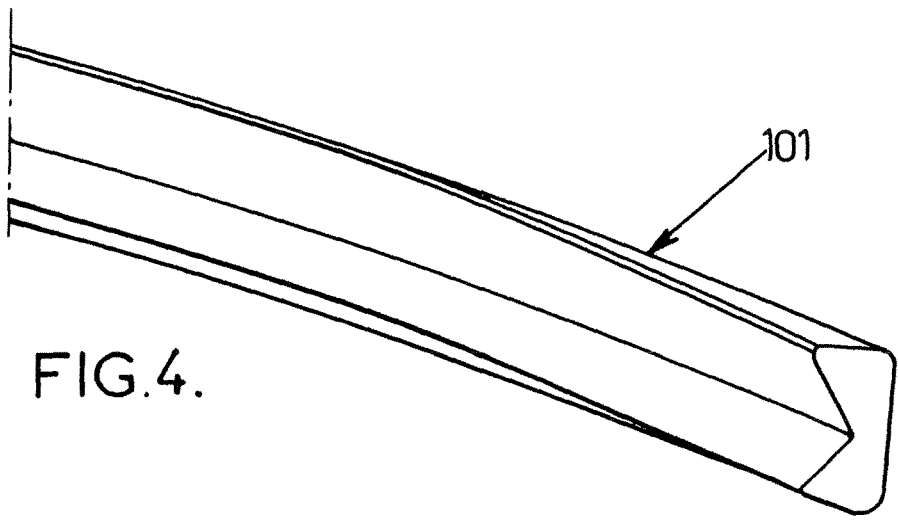
FIG. 4 represents a diagrammatic view of a bezel fabricated by deformation on a bowl.

FIG. 4 represents a diagrammatic view of a bezel fabricated by deformation on a bowl. In this fabrication method, a bezel wire is first formed to shape on a plane template and is then deformed on a meniscus bowl. The resulting bezel is substantially perpendicular to the boxing plane over the entire contour of the frame.

Figure 5:
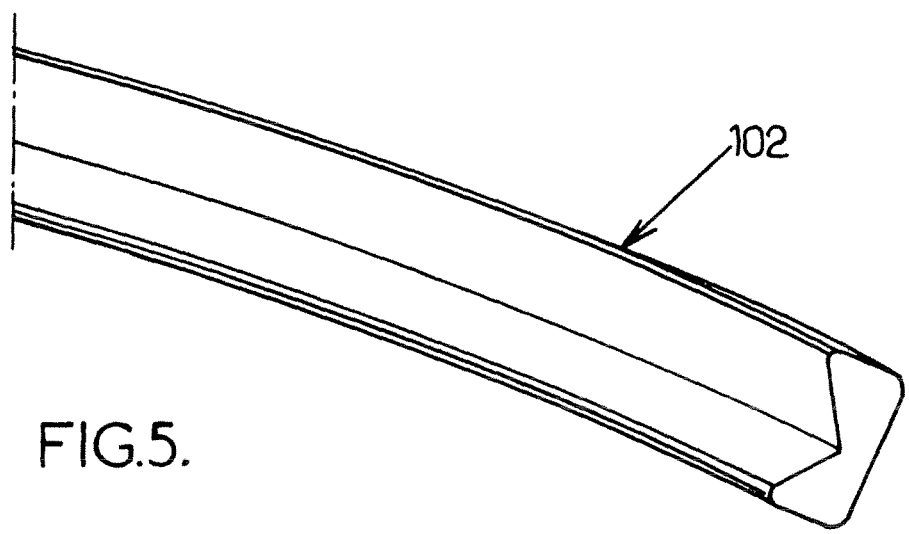
FIG. 5 represents a diagrammatic view of a bezel fabricated using a 3D rim-shaping machine.

FIG. 5 represents a diagrammatic view of a bezel fabricated using a 3D rim-shaping machine. In this embodiment, the bezel wire is formed on a plane plate and die-stamped to obtain a frame with a meniscus.

Note that the orientation of the bezel is different in the FIG. 4 and FIG. 5 embodiments.

Note that machines for cutting lenses are nowadays for the most part of the three-axis type. The resulting cut bevel is then perpendicular to the boxing plane.

The inventors have found that, in the case of a frame formed with a meniscus on a bowl, the bevel cut in this way can easily be nested in the frame subject to deformation of the frame during nesting.

In contrast, they have found that the orientation of the bevel fabricated in this way does not correspond to the orientation of the bezel in the case of nesting in a frame fabricated using a 3D rim-shaping machine. As a result of this, one can advantageously calculate a nesting correction to size the lens to enable satisfactory closure of the barrel of the frame.

FIG. 6 is a diagrammatic view in section of the nesting of a bevelled lens L1 in a bezel 11 of a frame 10.

In the situation represented, the tip 21 of the bevel 20 on the lens L1 does not contact the bottom 12 of the bezel 11, but instead one of the edges of the bezel 11.

The lens L1 has a front face 25 and a rear face 26. The front portion of the frame 10 is designated 13.

By determining the shape of the profile of the bezel at a point on the temple portion of the frame it is possible to deduce the tilt angle, the aperture angle A and/or the aperture D of the rim of the frame.

If the tilt angle corresponds to the orientation normal to the curvature of the frame at the measuring point in the temple portion of the frame, it can be deduced that the bezel wire was shaped on a 3D rim-shaping machine.

It can then be assumed that the tilt angle corresponds to the angle to the normal to the curvature of the frame over the entire rim-shaping contour. It is also possible to take account of the predicted deformation of the frame during nesting. In this case, the trajectory of the bevel on the lens is slightly different from the contour of the undeformed frame. Thanks to this information, it is possible to determine and fabricate the optimum shape of the bevel on the lens.

For example, the points of contact between the bevel on the lens and the bezel can also be calculated and radius and Z corrections deduced therefrom. The calculation of these corrections can advantageously take account of the aperture angle A and the aperture D of the bezel.

It is therefore possible to define complementary data including the tilt angle of the bezel, for example, that can be used to define setpoint cuts when using a five-axis machine.

The present invention is in no way limited to the embodiment described and shown, to which the person skilled in the art will know how to apply any variant conforming to the spirit of the invention.

The invention claimed is:

1. A method of determining parameters for fitting an ophthalmic lens to a frame, comprising the steps of:
   providing an eyeglass frame including at least one temple portion having a bezel adapted to enable the nesting of an ophthalmic lens;
   determining the shape of the profile of the bezel at a point in the at least one temple portion of said frame;
   based on the shape determination, retrieving data concerning evolution of an inclination of the bezel around the frame, the data having been previously stored in a database in association with the shape of the profile of the bezel as determined at a point in the at least one temple portion of the frame; and
   determining parameters for trimming the ophthalmic lens and fitting the lens to the frame based on said data concerning the evolution of the inclination of the bezel around the frame.

2. The method according to claim 1, wherein the shape of the profile of the bezel is determined at only one point for each of the rims of the frame.

3. The method according to claim 1, wherein the frame is a closed frame.

4. The method according to claim 1, wherein the frame is a semi-open frame.

5. The method according to claim 1, wherein whether the frame is the result of deformation of a bezel wire on a bowl or of deformation of a bezel wire using a 3D rim-shaping machine is determined.

6. A method of fabricating an ophthalmic lens, comprising the steps of:
   determining at least the trimming parameters of a chosen eyeglass frame according to claim 1; and trimming the lens according to the determined trimming parameters in order to enable nesting in the chosen eyeglass frame.

7. The method according to claim 1, wherein determining the parameters for trimming the ophthalmic lens and fitting the ophthalmic lens to the frame based on said data concerning the evolution of the inclination of the bezel around the frame comprises:

deducing, from the shape of the profile of the bezel at a point in the at least one temple portion of said frame, a method according to which a bezel wire has been shaped to form the frame, and calculating the parameters for trimming the ophthalmic lens and fitting the ophthalmic lens to the frame by taking into account a deformation of the bezel wire, the deformation being determined in accordance with the method according to which the bezel wire has been shaped to form the frame.

8. The method according to claim 7, wherein the parameters for trimming the ophthalmic lens include a contour of the finished lens and the shape of a bevel along the contour in order to enable nesting in the provided eyeglass frame.

9. The method according to claim 1, wherein the parameters for trimming the ophthalmic lens include a contour of the finished lens and the shape of a bevel along the contour in order to enable nesting in the provided eyeglass frame.

* * * * *